US012693713B2

(12) United States Patent
Wu et al.

(10) Patent No.: US 12,693,713 B2
(45) Date of Patent: Jul. 28, 2026

(54) ROTARY SHAFT MECHANISM AND FOLDABLE DISPLAY DEVICE

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Fengping Wu, Beijing (CN); Wei Qing, Beijing (CN); Ren Xiong, Beijing (CN); Jun Zhang, Beijing (CN); Chuankun You, Beijing (CN); Jia Zeng, Beijing (CN); Zhihui Wang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 265 days.

(21) Appl. No.: 18/577,399

(22) PCT Filed: Apr. 24, 2023

(86) PCT No.: PCT/CN2023/090328
§ 371 (c)(1),
(2) Date: Jan. 8, 2024

(87) PCT Pub. No.: WO2023/207910
PCT Pub. Date: Nov. 2, 2023

(65) Prior Publication Data
US 2024/0310882 A1     Sep. 19, 2024

(30) Foreign Application Priority Data
Apr. 27, 2022     (CN) .......................... 202210454452.1

(51) Int. Cl.
*G06F 1/16* (2006.01)

(52) U.S. Cl.
CPC .......... *G06F 1/1681* (2013.01); *G06F 1/1652* (2013.01)

(58) Field of Classification Search
CPC .. G06F 1/1681; G06F 1/1652; H04M 1/0235; H04M 1/022; H04M 1/0225
See application file for complete search history.

(56) References Cited

U.S. PATENT DOCUMENTS

| | | | |
|---|---|---|---|
| 10,480,227 B1 * | 11/2019 | Chen | ...................... E05D 3/122 |
| 10,664,021 B1 | 5/2020 | Hsu et al. | |

(Continued)

FOREIGN PATENT DOCUMENTS

| | | |
|---|---|---|
| CN | 111615277 A | 9/2020 |
| CN | 212509197 U | 2/2021 |

(Continued)

OTHER PUBLICATIONS

Office Action dated Mar. 20, 2023, issued in counterpart CN Application No. 202210454452.1, with English translation. (15 pages).

*Primary Examiner* — Anthony Q Edwards
(74) *Attorney, Agent, or Firm* — WHDA, LLP

(57) ABSTRACT

Provided is a rotary shaft mechanism including a curved base, a screen support plate, a curved slider, and a rotating block; the curved base includes a first centerline extending along X direction and two curved connecting portions symmetrically arranged around the first centerline; in the X direction, the screen support plates are on opposite sides of the curved base, each curved connecting portion is connected to the corresponding screen support plate through the curved slider and the rotating block; along the X direction, each curved connecting portion is divided into first and second curved guide grooves, the rotating block includes a (Continued)

curved connector connected to the first curved guide groove, and a sliding connector slidably connected to the screen support plate; the curved slider is rotatably connected into the second curved guide groove, and the curved slider is rotatably connected to the screen support plate through a pin-shape shaft.

18 Claims, 8 Drawing Sheets

(56)                    References Cited

U.S. PATENT DOCUMENTS

| | | | | |
|---|---|---|---|---|
| 11,243,578 | B2 * | 2/2022 | Torres | G06F 1/1616 |
| 11,408,214 | B1 * | 8/2022 | Hsu | H04M 1/022 |
| 11,644,873 | B2 * | 5/2023 | Hsu | G06F 1/1681 |
| | | | | 361/679.27 |
| 11,681,335 | B1 * | 6/2023 | Hsu | G06F 1/1681 |
| | | | | 361/679.01 |
| 12,474,745 | B2 * | 11/2025 | You | G06F 1/1681 |
| 2016/0208530 | A1 | 7/2016 | Tatsukami et al. | |
| 2020/0409429 | A1 * | 12/2020 | Hsu | E05D 11/06 |
| 2021/0355988 | A1 | 11/2021 | Cheng et al. | |
| 2022/0247843 | A1 * | 8/2022 | Hu | G06F 1/1681 |
| 2023/0053373 | A1 * | 2/2023 | Kim | H04M 1/0268 |
| 2023/0067187 | A1 * | 3/2023 | Lin | F16C 11/04 |
| 2024/0310882 | A1 * | 9/2024 | Wu | G06F 1/1681 |
| 2024/0314952 | A1 * | 9/2024 | Park | G06F 1/1681 |

FOREIGN PATENT DOCUMENTS

| | | |
|---|---|---|
| CN | 214661465 U | 11/2021 |
| CN | 214661469 U | 11/2021 |
| CN | 114776696 A | 7/2022 |
| WO | 2022/068290 A1 | 4/2022 |

* cited by examiner

ROTARY SHAFT MECHANISM AND FOLDABLE DISPLAY DEVICE

CROSS-REFERENCE TO RELATED APPLICATION

The present application is the U.S. national phase of PCT Application No. PCT/CN2023/090328 filed on Apr. 24, 2023 which claims priority to the Chinese patent application No. 202210454452.1 filed in China on Apr. 27, 2022, a disclosure of which is incorporated herein by reference in its entirety.

TECHNICAL FIELD

The present disclosure relates to the technical field of foldable display product manufacturing, in particular, to a rotary shaft mechanism and a foldable display device.

BACKGROUND

In rotary shaft design processes provided in the past, due to not considering a force acting on a screen, a motion trajectory of a rotary shaft was generally a circular arc. According to a circular arc rotation trajectory, it can be known that during a most dangerous initial bending process of the screen, the motion trajectory of the circular arc will cause the screen to be pulled. If the screen is in this state for a long time, during testing dynamic bending reliability, the screen may be fatigued and damaged due to repeatedly being pulled.

SUMMARY

In order to solve the above-mentioned technical problems, the present disclosure provides a rotary shaft mechanism and a foldable display device to solve the problem that a screen is subject to tension during a folding process.

In order to achieve the above objective, technical solutions adopted in the embodiments of the present disclosure are as follows. A rotary shaft mechanism is configured to fold a display panel, wherein, the rotary shaft mechanism includes a curved base, two screen support plates, a curved slider, and a rotating block;

the curved base includes a first centerline extending along a first direction, and the curved base includes two curved connecting portions symmetrically arranged around the first centerline; in the first direction, the two screen support plates are respectively on opposite sides of the curved base, each curved connecting portion is connected to a corresponding screen support plate through the curved slider and the rotating block;

along the first direction, each curved connecting portion is divided into a second curved guide groove and a first curved guide groove, both the second curved guide groove and the first curved guide groove extend along a second direction, the second direction is perpendicular to the first direction;

the rotating block includes a curved connector connected to the first curved guide groove, and a sliding connector slidably connected to the screen support plate;

the curved slider is rotatably connected into the second curved guide groove, and the curved slider is rotatably connected to the screen support plate through a pin-shape shaft, a vertical distance between a rotation center of the curved slider and a first plane is different from a vertical distance between a rotation center of the rotating block and the first plane, so that when the rotary shaft mechanism is folded, the rotating block and the screen support plate slide relative to each other in a direction parallel to the screen support plate, and the first plane is a contact plane between the screen support plate and the rotating block.

Optionally, a side of the curved slider is provided with a first pin-shape shaft hole that runs through the curved slider in the first direction, the screen support plate is provided with a second pin-shape shaft hole that matches the first pin-shape shaft hole to allow the pin-shape shaft to pass through.

Optionally, a strip-shaped hole extending along the second direction is in the sliding connector, and a sliding groove is in the screen support plate and used for inserting the sliding connector, a sliding hole is in one side of the sliding groove away from a bearing surface of the screen support plate, and a length of the sliding hole in the second direction is smaller than a length of the strip-shaped hole in the second direction, the sliding hole is to be matched with the strip-shaped hole to allow a sliding member to pass through, and to enable the sliding member to slide along the strip-shaped hole.

Optionally, in the first direction, the rotating block further includes a reinforcing rod on one side of the strip-shaped hole.

Optionally, both the second curved guide groove and the first curved guide groove are in the middle of the curved connecting portion in a third direction; in a unfolded state, a surface of the curved connecting portion is in a same plane as a bearing surface of the screen support plate, the third direction is perpendicular to the first direction, and the third direction is perpendicular to the second direction.

Optionally, the rotary shaft mechanism further includes: a gear group, a connecting rod, a synchronous transmission rod, and a fixing plate on the curved base, wherein the connecting rod extends along the first direction, and a first end of the synchronous transmission rod is meshed and connected with the gear group, and is sleeved on the connecting rod and is rotatable around the connecting rod, a second end of the synchronous transmission rod is fixed on the screen support plate, and the fixing plate is sleeved on the connecting rod, the fixing plate is on one side of the synchronous transmission rod away from the curved base; one side, close to the fixing plate, of the first end of the synchronous transmission rod is provided with a limiting protrusion, and a limiting groove is provided in the fixing plate, the limiting groove is matched with the limiting protrusion to limit a position of the synchronous transmission rod in a unfolded state or a folded state.

Optionally, an end surface of the first end is divided into a first portion and a second portion, the first portion is convex to form the limiting protrusion having a fan shape, the limiting protrusion is rotatably accommodated in the limiting groove, the second portion is rotatably connected to connecting surfaces around the limiting groove.

Optionally, the rotary shaft mechanism further includes: a friction plate, an elastic member, and a fixing member, wherein the elastic member is sleeved on the connecting rod and on one side of the fixing plate away from the curved base, the fixing member is sleeved on the connecting rod and on one side of the elastic member away from the fixing plate, so as to fix the elastic member;

the fixing plate includes a via hole, the via hole allows the connecting rod to pass through, and the fixing plate includes a first surface connected to the elastic member, a connecting groove is formed by depressing surroundings of the via hole on the first surface, and the friction plate is connected into the connecting groove.

Optionally, the rotary shaft mechanism further includes: a concave convex wheel between the friction plate and the elastic member, wherein a concave convex surface of the concave convex wheel is connected to the friction plate.

A foldable display device is further provided in the embodiments of the present disclosure, and includes a rotary shaft mechanism described above, and a display panel fixed on the rotary shaft mechanism.

The beneficial effects of the present disclosure are: the vertical distance between the rotation center of the curved slider and the first plane is different from the vertical distance between the rotation center of the rotation block and the first plane, the first plane is a contact plane between the screen support plate and the rotating block, so that the motion trajectory of the rotary shaft mechanism during folding is non circular arc, thereby alleviating the problem that the display panel is subject to tension during folding.

Figure 1:
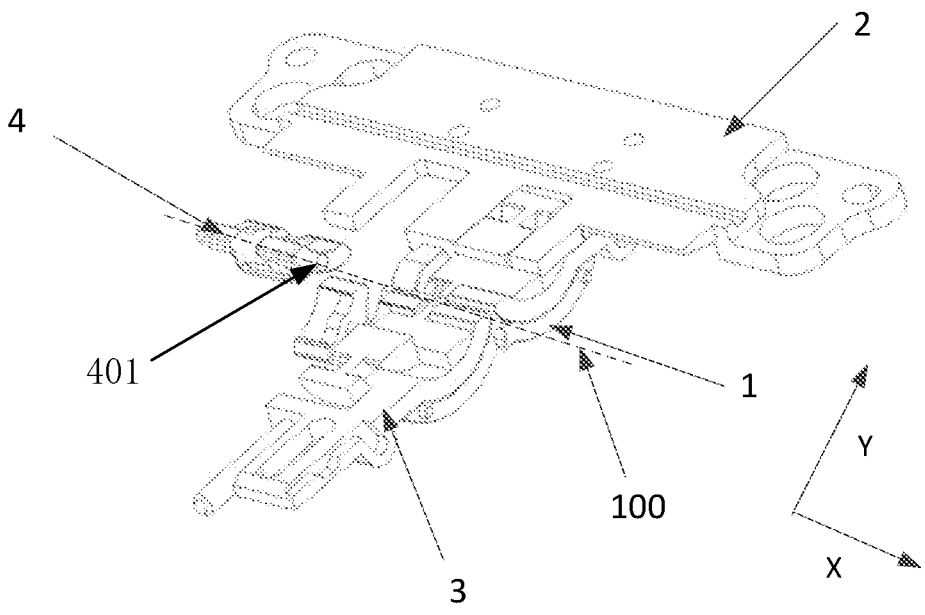
FIG. 1 is a schematic diagram of a partial structure of a rotary shaft mechanism in the embodiments of the present disclosure.

1 curved base; 100 first centerline; 11 curved connecting portion; 12 first curved guide groove; 13 second curved guide groove; 2 screen support plate; 21 sliding groove; 211 sliding hole; 22 first connecting rod; 221 pin-shape shaft; 3 rotating block; 31 curved connector; 32 sliding connector; 321 strip-shaped hole; 322 reinforcing rod; 4 curved slider; 5 fixing plate; 51 limiting groove; 52 connecting surface; 53 connecting groove; 54 via hole; 6 synchronous transmission rod; 61 limiting protrusion; 7 second connecting rod; 8 elastic member; 9 concave convex wheel; 10 friction plate; 101 fixing member; 102 gear group; 401 first pin-shape shaft hole; 201 supporting body; 200 second pin-shape shaft hole; 500 first plane; 601 first end; 602 second end;

DETAILED DESCRIPTION

In order to make the objectives, technical solutions and advantages of the present disclosure clearer, the present disclosure will be further described in detail below with reference to the accompanying drawings. Obviously, the described embodiments are only a part of the embodiments of the present disclosure, rather than all of them. Based on the embodiments in the present disclosure, all other embodiments obtained by those of ordinary skill in the art without creative work shall fall within the protection scope of the present disclosure.

In the description of the present disclosure, it should be noted that the terms "center", "up", "down", "left", "right", "vertical", "horizontal", "inside", "outside", etc. indicate orientation or positional relationship based on the orientation or positional relationship shown in the drawings, are only for the convenience of describing the present disclosure and simplifying the description, rather than indicating or suggesting that the device or element must have a specific orientation and be constructed and operated in a specific orientation, thus cannot be understood as a limitation of the present disclosure. In addition, the terms "first", "second", "third", etc. are used for descriptive purposes only, and should not be interpreted as indicating or implying relative importance.

Referring to FIG. 1 to FIG. 16, the embodiments provide a rotary shaft mechanism for folding a display panel. The mechanism includes a curved base 1, screen support plates 2, a curved slider 4, and a rotating block 3.

The curved base 1 includes a first centerline 100 extending along a first direction (referring to a X direction in FIG. 1), and the curved base 1 includes two curved connecting portions 11 symmetrically arranged around the first centerline 100. In the first direction, the screen support plates 2 are arranged on two opposite sides of the curved base 1, respectively, each curved connecting portion 11 is connected to the corresponding screen support plate 2 through the curved slider 4 and the rotating block 3.

Along the first direction, each curved connecting portion 11 includes a second curved guide groove 13 and a first curved guide groove 12. The second curved guide groove 13 and the first curved guide groove 12 both extend along a second direction, the second direction is perpendicular to the first direction (referring to a Y direction in FIG. 2).

The rotating block 3 includes a curved connector 31 connected to the first curved guide groove 12, and a sliding connector 32 slidably connected to the screen support plate 2.

The curved slider 4 is rotatably connected to an inner wall of the second curved guide groove 13, and the curved slider 4 is rotatably connected to the screen support plate 2 through a pin-shape shaft 221. A vertical distance between a rotation center of the curved slider 4 and a first plane 500 is different from a vertical distance between a rotation center of the rotating block 3 and the first plane 500, so that when the rotary shaft mechanism is folded, the rotating block 3 slides relative to the screen support plate 2 in a direction parallel to the screen support plate 2, and the first plane 500 is a contact plane between the screen support plate 2 and the rotating block 3, see the plane where CD is located in FIG. 2 and FIG. 3.

In rotary shaft design processes in the past, since a force acting on a screen is not considered, a motion trajectory of the rotary shaft was generally a circular arc. According to a circular arc rotation trajectory, it can be known that during the most dangerous initial bending process of the screen (0-10 degrees, it should be understood that different products have different angle ranges), the circular motion trajectory will cause the screen to be pulled. If the screen is in this state for a long time period, the screen may be fatigued and damaged due to repeated pulling during testing dynamic bending reliability. In the embodiments, the vertical distance between the rotation center of the curved slider 4 and the first plane is different from the vertical distance between the rotation center of the rotation block 3 and the first plane, are different, thereby achieving a non-circular arc trajectory motion of the rotary shaft mechanism. Compared to the circular arc trajectory in the related art, the motion trajectory of the rotary shaft mechanism in the embodiments gradually deviates towards the inner side of the circular arc when the rotary shaft mechanism is folded, thereby reducing the tension on the screen.

Due to the fact that both the rotating block 3 and the curved slider 4 are connected to the screen support plates 2 and rotation centers of the rotating block 3 and the curved slider 4 are different, if both the rotating block 3 and the curved slider 4 are directly fixedly connected to the screen support plates 2, the entirety of the structure cannot rotate due to insufficient freedom. Therefore, connection between the rotating block 3 and the screen support plate 2 is designed as slidable connection, and the connection between the curved slider 4 and the screen support plate 2 is designed as rotatable connection. Therefore, during the rotation process, the curved slider 4 can ensure that the screen support plate 2 and the rotating block 3 are parallel through two rotations, facilitating the relative sliding between the rotating block 3 and the screen support plate 2.

Figure 9:
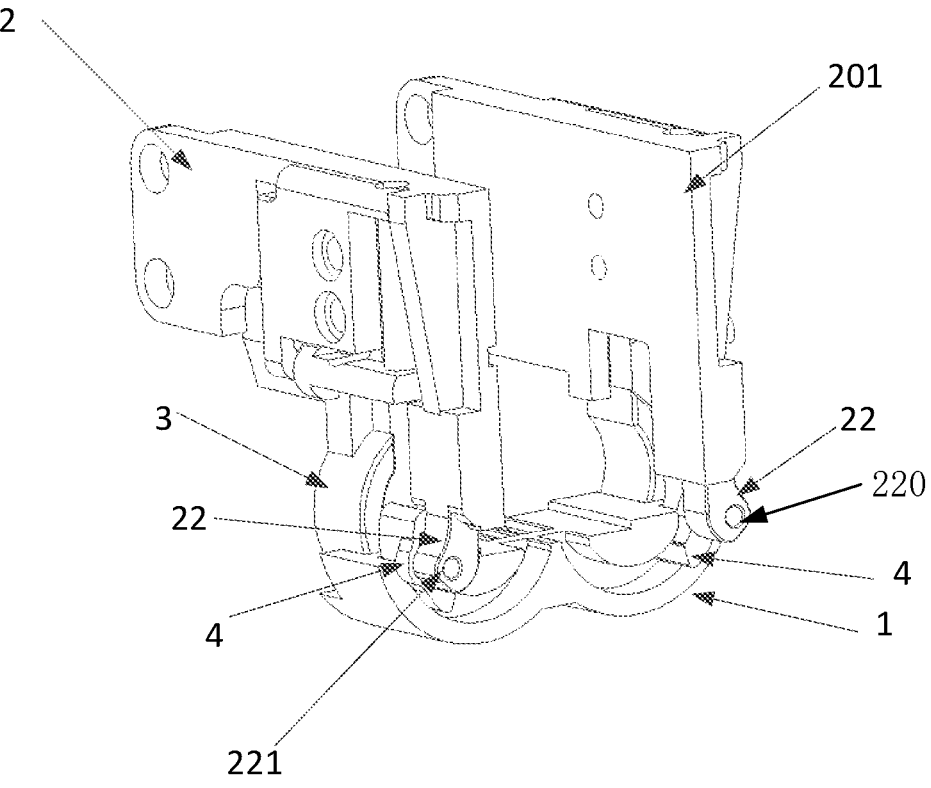
FIG. 9 is a second schematic diagram of the rotary shaft mechanism in the folded state in the embodiments of the present disclosure.
Figure 10:
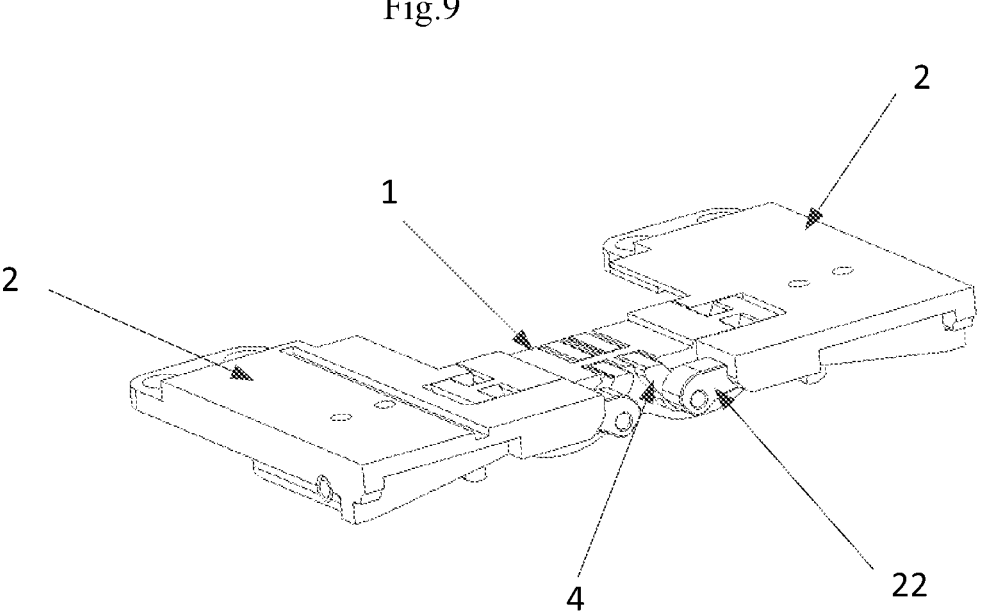
FIG. 10 is a schematic diagram of the rotary shaft mechanism in an unfolded state in the embodiments of the present disclosure.

For example, a side of the curved slider 4 is provided with a first pin-shape shaft hole 401 that runs through the curved slider 4 in the first direction, referring to FIG. 1; the screen support plate 2 is provided with a second pin-shape shaft hole 220 that matches the first pin-shape shaft hole 401 to allow the pin-shape shaft to pass through, as shown in FIG. 9.

Referring to FIG. 9, the screen support plate 2 includes a support body 201, and one side of the support body 201 is connected to a first connecting rod 22 for connecting with the curved slider 4. The first connecting rod 22 has a connecting end away from the support body 201, and the connecting end is provided with the second pin-shape shaft hole 220.

In order to facilitate the relative rotation between the screen support plate 2 and the curved slider 4, an end surface of the connecting end is a curved surface.

For example, a strip-shaped hole 321 extending along the second direction is provided on the sliding connector 32, and a sliding groove 21 is provided on the screen support plate 2 and used for inserting the sliding connector 32. A sliding hole 211 is provided on one side, away from a bearing surface of the screen support plate 2, of the sliding groove 21, and the length of the sliding hole 211 in the second direction is smaller than a length of the strip-shaped hole 321 in the second direction, so that the sliding hole 211 is to be matched with the strip-shaped hole 321 to allow a sliding member (not shown in the figures) to pass through and to slide along the strip-shaped hole 321.

Figures 5, 6:
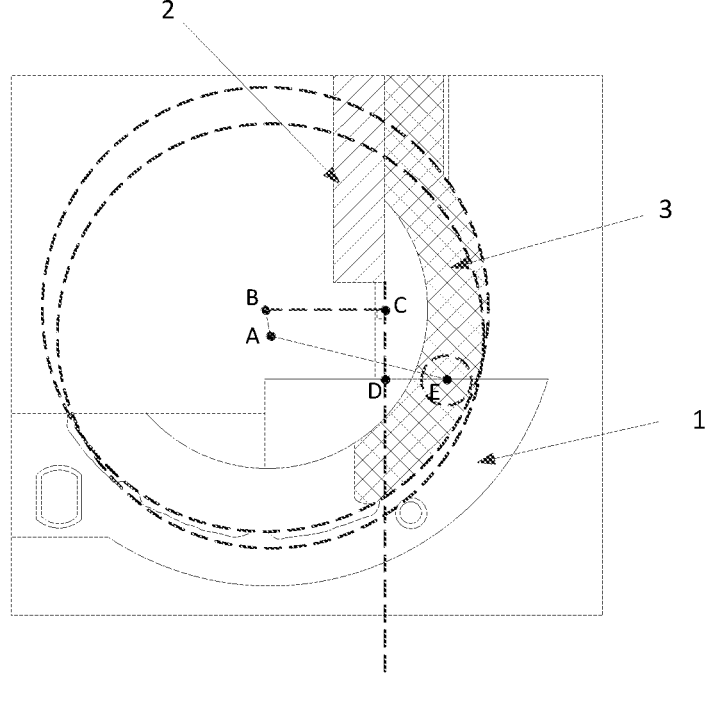
FIG. 5 is a third schematic diagram of a motion state of the rotary shaft mechanism in the embodiments of the present disclosure.
FIG. 6 is a schematic diagram of a structure of a rotating block in the embodiments of the present disclosure.
Figure 8:
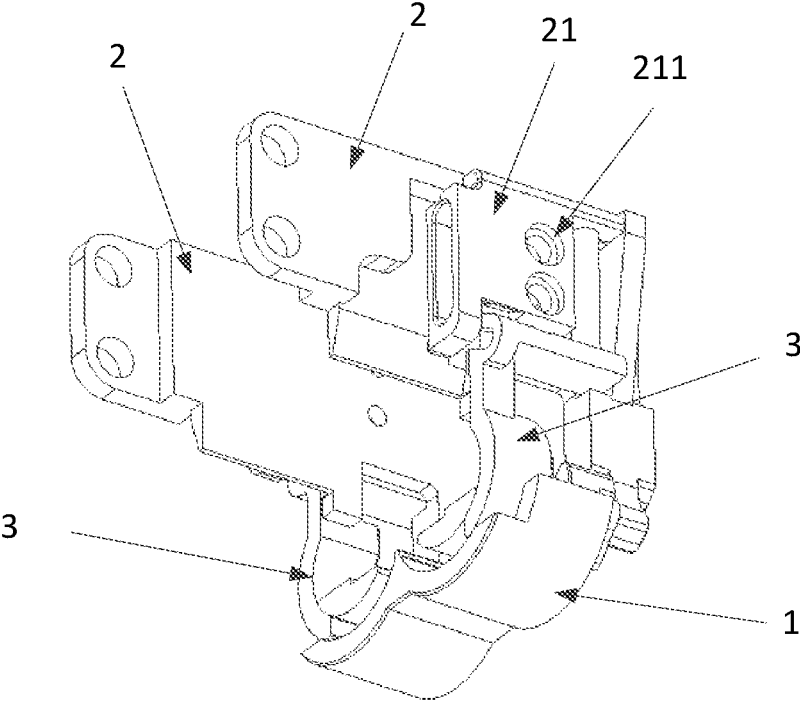
FIG. 8 is a first schematic diagram of the rotary shaft mechanism in a folded state in the embodiments of the present disclosure.

Referring to FIG. 6 and FIG. 8, when in an unfolded state, the sliding hole 211 is in the middle of the strip-shaped hole 321, or at one end of the strip-shaped hole 321 near the curved connector 31; when in a folded state, the screen support plate 2 slides relative to the rotating block 3, and the sliding hole 211 is at one end, away from the curved connector 31, of the strip-shaped hole 321.

During the folding process, the screen support plate 2 slides relative to the rotating block 3, and the screen support plate 2 moves to be close to the curved base 1, to change the motion trajectory of the rotary shaft mechanism to a non-circular arc trajectory and reduce the tension on the screen.

Figure 2:
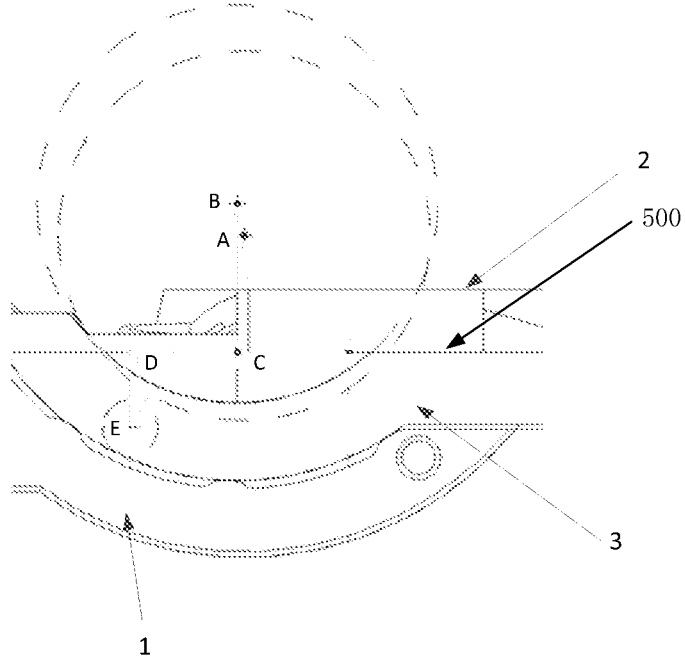
FIG. 2 is a first schematic diagram of a motion state of the rotary shaft mechanism in the embodiments of the present disclosure.
Figure 4:
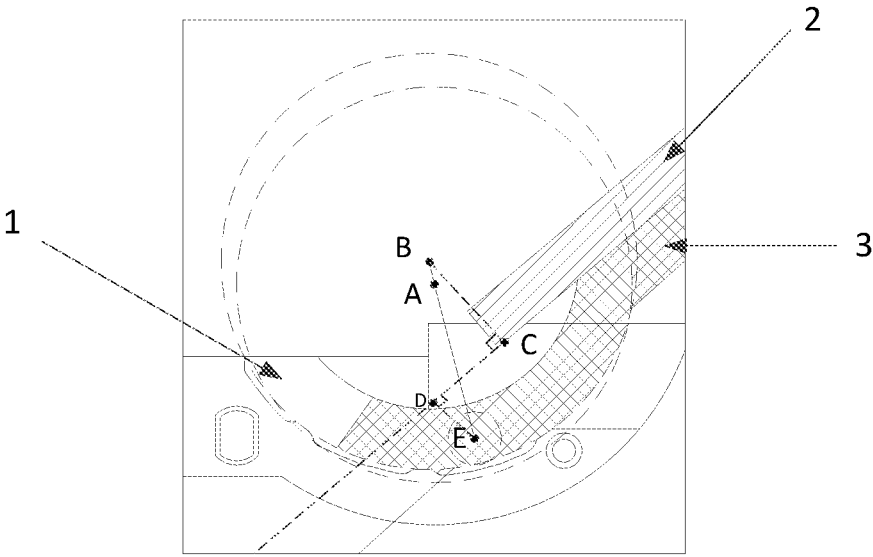
FIG. 4 is a second schematic diagram of a motion state of the rotary shaft mechanism in the embodiments of the present disclosure.

FIG. 2 is a schematic diagram of the rotary shaft mechanism in the unfolded state, FIG. 4 is a schematic diagram of the rotary shaft mechanism after being folded for several angles (i.e., a schematic diagram of an intermediate state between the unfolded state and the folded state), and FIG. 5 is a schematic diagram of the rotary shaft mechanism in the folded state.

Figure 3:
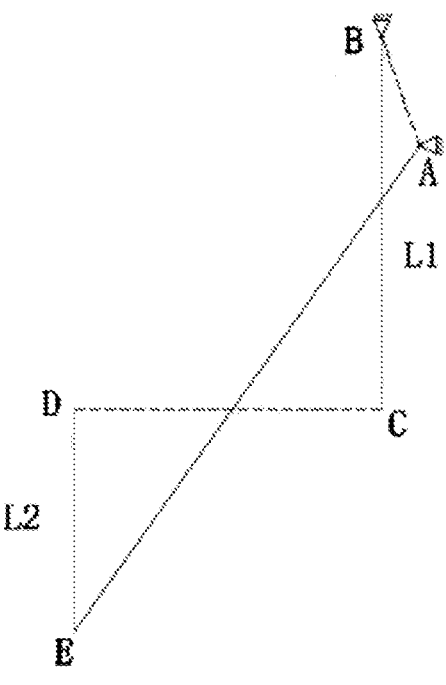
FIG. 3 is a schematic diagram of a rotary shaft trajectory model in the embodiments of the present disclosure.

Here, in the unfolded state, the circular arc trajectories on both sides of the curved base 1 are shown in FIG. 2. The simplified and enlarged model is shown in FIG. 3. Point A is a virtual center of the curved slider 4 (virtual rotation center), point B is a virtual center of the rotation block 3 (virtual rotation center), and point E is a connection point between the curved slider 4 and the screen support plate 2 (i.e. the center of the first pin-shape shaft hole 401).

CD is a contact plane between the rotating block 3 and the screen support plate 2 (point C is an intersection between the contact plane of the screen support plate 2 and the rotating block 3 and a line drawn perpendicular to the contact plane from point B, and point D is an intersection between the contact plane of the screen support plate 2 and the rotating block 3 and a line drawn perpendicular to the contact plane from point E, i.e. the first plane 500). When in the unfolded state, the rotary shaft mechanism is placed horizontally, and the straight line CD is parallel to the horizontal plane. When in the folded state, the straight line CD is perpendicular to the horizontal plane.

BC is a distance from the virtual center of the rotating block 3 to the first plane, the distance is a fixed value;

AE is a distance from the virtual center of the curved slider 4 to the center of the first pin-shape shaft hole, the distance is a fixed value;

DE is a distance between the first plane and the center of the first pin-shape shaft hole, the distance is a fixed value;

The change of CD characterizes the relative sliding between the screen support plate 2 and the rotating block 3. As the CD increases, the screen support plate 2 moves to the left (towards the direction close to the curved base 1) relative to the rotating block 3, which can compensate for the tension on the screen.

From FIG. 2 to FIG. 5, it can be seen that when the rotary shaft mechanism is folded, and BC rotates counterclockwise to make AE and AB collinear, the length of CD reaches its maximum (which can be obtained from geometric principles). Referring to FIG. 4, that is, at this time, the screen shrinkage distance reaches its maximum, which is the maximum compensation achieved by the relative sliding between the screen support plate 2 and the rotating block 3. In one embodiment, when BC rotates counterclockwise to make AE and AB collinear, the bending angle of the screen is the bending angle when the screen is subject to the maximum tension, in order to effectively alleviate the tension situation of the screen.

During the folding process, the corresponding relationship between the tension applied on the screen and the corresponding bending angle can be obtained through simulation. Based on the corresponding relationship, setting the parameters of the corresponding components of the rotary shaft mechanism can achieve that when BC rotates counterclockwise to make AE and AB collinear, the bending angle of the screen is the bending angle when the screen is subject to the maximum tension. For example, the distance between BC and DE can be adjusted. Through the rotary shaft mechanism in the embodiments, it can solve the problem that the rotary shaft mechanism cannot shrink during rotation.

Referring to FIG. 6, for example, in the first direction, the rotating block 3 further includes a reinforcing rod 322 to one side of the strip-shaped hole 321. The setting of the reinforcing rod 322 enhances the stability of the connection between the rotating block 3 and the screen support plate 2.

Figure 7:
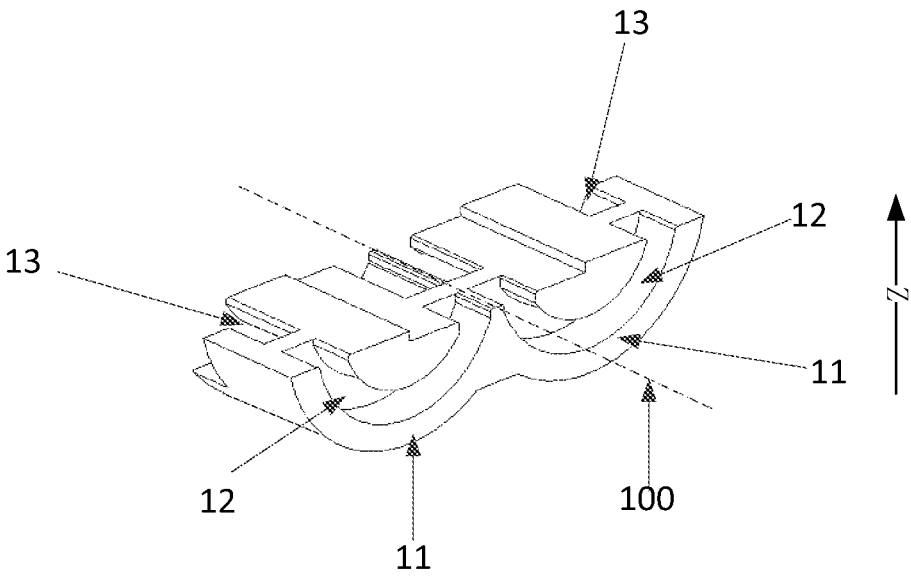
FIG. 7 is a schematic diagram of a structure of a curved base in the embodiments of the present disclosure.

Referring to FIG. 7, for example, the second curved guide groove 13 and the first curved guide groove 12 are both located in the middle of the curved connecting portion 11 in a third direction (referring to a Z direction in FIG. 7). In the unfolded state, a surface of the curved connecting portion 11 is in a same plane as the bearing surface of the screen support plate 2, the third direction is perpendicular to the first direction, and the third direction is perpendicular to the second direction.

The second curved guide groove 13 and the first curved guide groove 12 are both located in the middle of the curved connecting portion 11 in the third direction, which can limit the curved slider 4 and the rotating block 3, preventing the curved slider 4 or the rotating block 3 from detaching from the corresponding curved guide groove during the folding process.

Referring to FIG. 12 to FIG. 16, for example, the rotary shaft mechanism further includes a gear group 102 installed on the curved base 1 (the gear group 102 is connected to the curved base 1 through an installation seat), a second connecting rod 7, a synchronous transmission rod 6, and a fixing plate 5. The second connecting rod 7 extends along the first direction (referring to the X direction in FIG. 1), and a first end 601 of the synchronous transmission rod 6 is meshed and connected to the gear group 102, and the first end 601 is sleeved on the second connecting rod 7 and can rotate around the second connecting rod 7. A second end 602 of the synchronous transmission rod 6 is fixed on the screen support plate 2, and the fixing plate 5 is sleeved on the second connecting rod 7 and connected to the installation seat. The fixing plate 5 is at one side of the synchronous transmission rod 6 away from the curved base 1.

One side, close to the fixing plate 5, of the first end 601 of the synchronous transmission rod 6 is provided with a limiting protrusion 61, and a limiting groove 51 is provided on the fixing plate 5. The limiting groove 51 is matched with the limiting protrusion 61 to limit a position of the synchronous transmission rod 6 in the unfolded state or the folded state.

Figure 11:
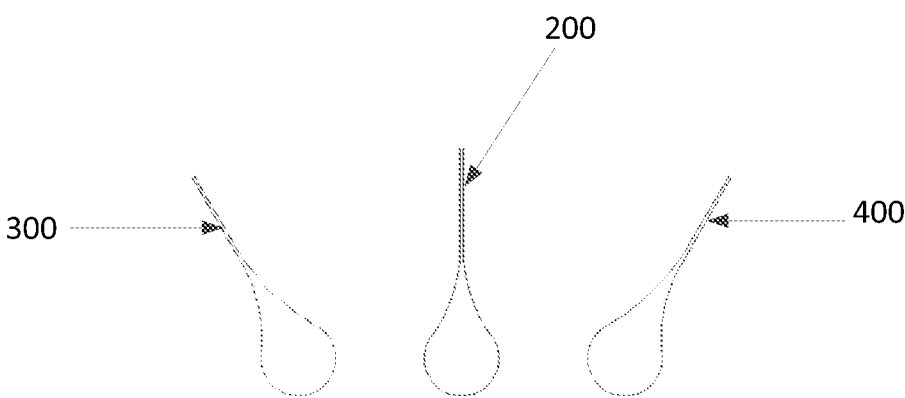
FIG. 11 is a comparative schematic diagram of missed meshing of the rotary shaft mechanism in the embodiments of the present disclosure.

As shown in the shape of water droplets in FIG. 11, in a case of normal meshing between a helical gear of the synchronous member (synchronous transmission rod 6) and the gear group 102, a water droplet bending shape of the screen is the shape of the middle water droplet 200. If the helical gear on the right side of the synchronous member (referring to the synchronous transmission rod 6 on the right side in FIG. 15) meshes and moves together with the gear group 102 after a few teeth are not meshed during rotation, then the helical gear on the left side of the rotary shaft (referring to the synchronous transmission rod 6 on the left side in FIG. 15) rotates by a few more teeth than the helical gear on the right side (referring to the synchronous transmission rod 6 on the right side in FIG. 15), and accordingly, the bending angle of the screen on the left side is larger, causing the difference in the bending shape constrained by baffles forming the water droplet shape on the left and right sides. The water droplet bending shape of the screen is like the bending shape of the water droplet 400 on the right side. In an ideal situation, the curvature radius of the droplet arc area on the left side of the shape of the water droplet 400 on the right side will be larger than that on the right, resulting in a larger bending area required for the screen (the formation of the water droplet 300 on the left side is opposite to that of the water droplet 400 on the right side). So when the screen is tilted to one side, still bend according to the normal bending area, which may not achieve the desired bending shape. At the same time, there may not be enough space for keeping away from the screen inside the rotary shaft. At the same time, the SUS Pattern (screen support plate 2) in the mechanism also protects the bending shape according to the normal bending shape of the water droplet 200 in the middle. If the above situation occurs, the SUS Pattern does not match the bending shape, in which case the screen may be damaged.

Referring to FIG. 12 to FIG. 16, in order to avoid the occurrence of the above problems, a stop structure is set in the embodiments, that is, the limiting protrusion 61 is set on one side, close to the fixing plate 5, of the first end 601 of the synchronous transmission rod 6, and a limiting groove 51 is set on the fixing plate 5. The limiting groove 51 is matched with the limiting protrusion 61 to limit a position of the synchronous transmission rod 6 in the unfolded state or the folded state. When the synchronous transmission rod 6 rotates to the unfolded state or the folded state, stopping can be implemented by matching the limiting protrusion 61 and the limiting groove 51. The height of the limiting protrusion 61 (the height in an extension direction of the second connecting rod 7) can be adjusted according to actual torque requirements of the rotary shaft to meet the stress requirements.

Figure 12:
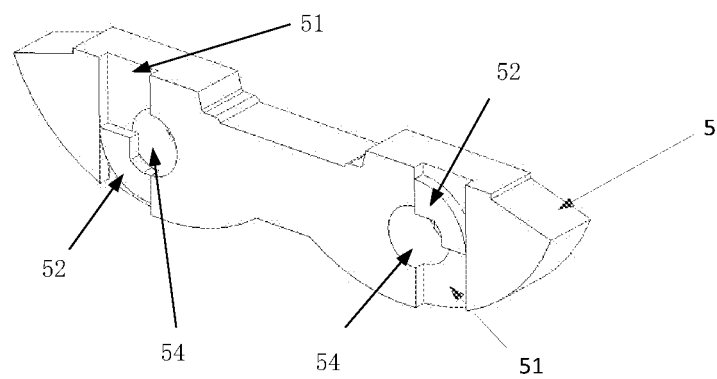
FIG. 12 is a schematic diagram of a structure of a fixing plate in the embodiments of the present disclosure.
Figure 13:
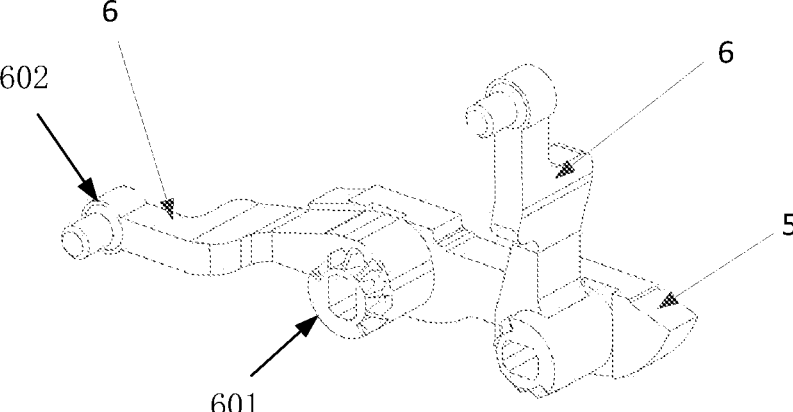
FIG. 13 is a schematic diagram of a connection between a synchronous transmission rod and the fixing plate in the embodiments of the present disclosure.
Figure 14:
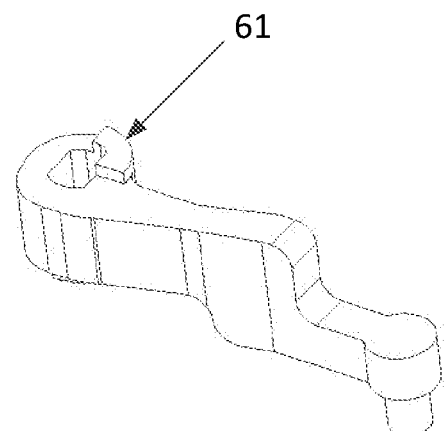
FIG. 14 is a schematic diagram of a structure of the synchronous transmission rod in the embodiments of the present disclosure.

Referring to FIG. 12 to FIG. 14, for example, an end surface of the first end 601 is divided into a first portion and a second portion. The first portion is convex to form the fan-shaped limiting protrusion 61, the limiting protrusion 61 is rotatably accommodated in the limiting groove 51. The second portion is rotatably connected to connecting surfaces 52 around the limiting groove 51.

The stop strength can be determined by the radius of the fan-shaped limiting protrusion 61 according to the actual size of the rotary shaft.

Figure 15:
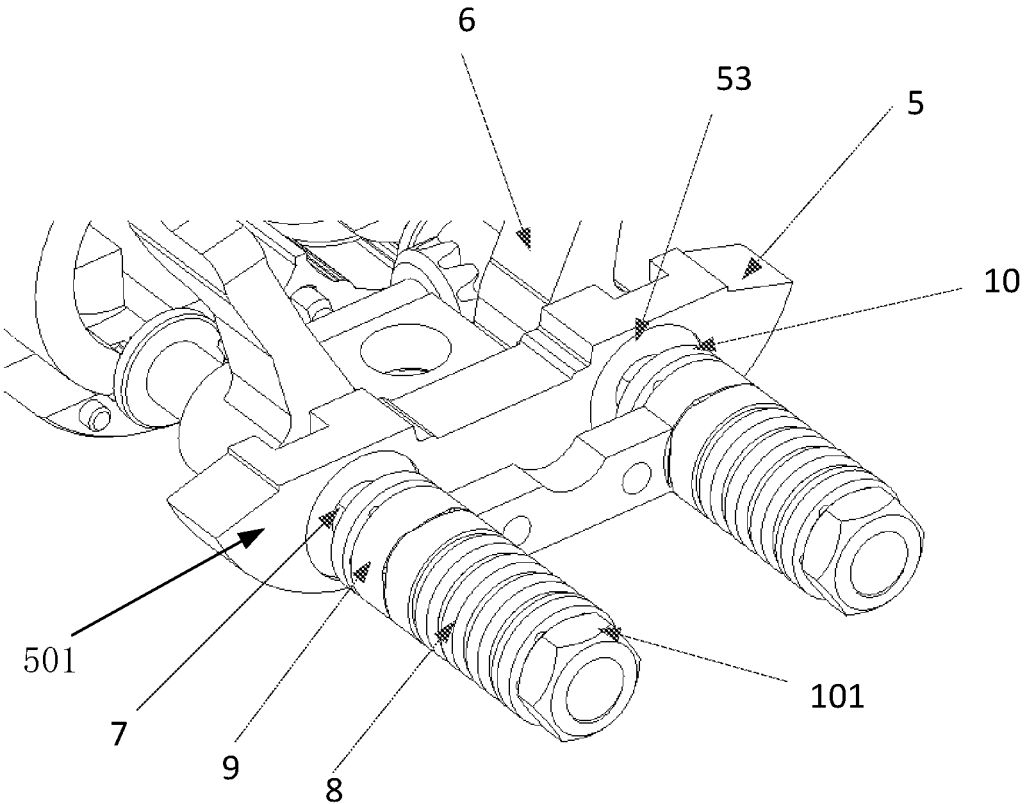
FIG. 15 is a schematic diagram of a partial structure of the rotary shaft mechanism in the embodiments of the present disclosure.
Figure 16:
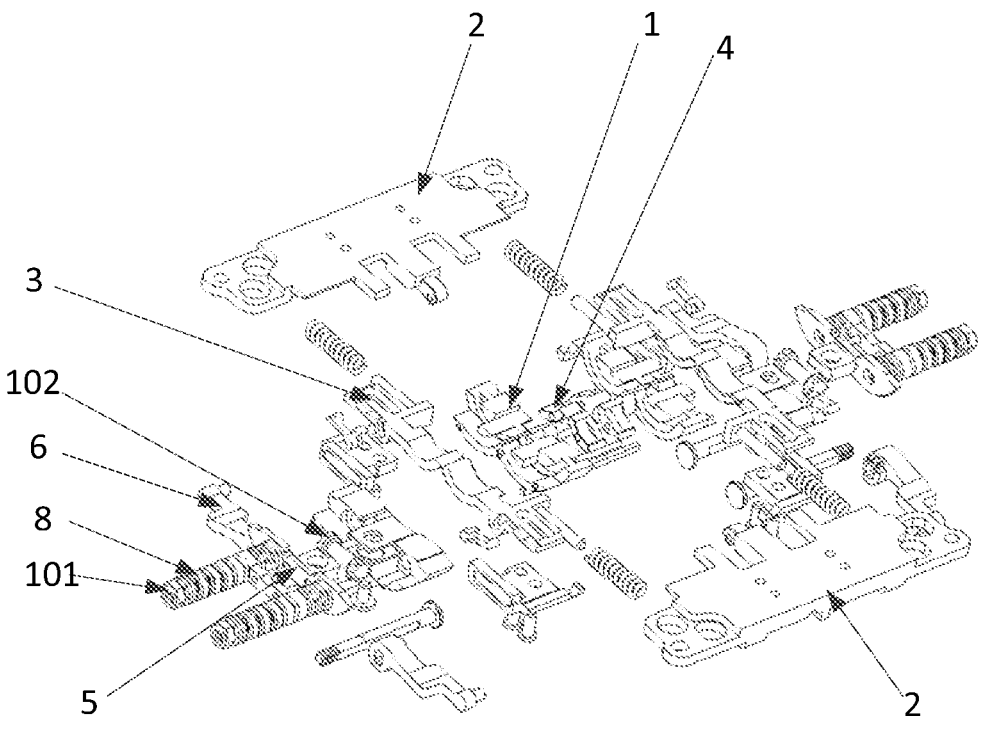
FIG. 16 is an exploded schematic diagram of the rotary shaft mechanism in the embodiments of the present disclosure.

Referring to FIG. 15 and FIG. 16, for example, the rotary shaft mechanism further includes a friction plate 10, an elastic member 8, and a fixing member 101. The elastic member 8 is sleeved on the second connecting rod 7 and on one side of the fixing plate 5 away from the curved base 1. The fixing member 101 is sleeved on the second connecting rod 7 and on one side of the elastic member 8 away from the fixing plate 5, so as to fasten the elastic member 8.

The fixing plate 5 includes a via hole 54, the via hole allows the second connecting rod 7 to pass through, and the fixing plate 5 includes a first surface 501 connected to the elastic member 8. A connecting groove 53 is formed by depressing surroundings of the via hole 54 on the first surface 501, and the friction plate 10 is connected to an inner wall of the connecting groove 53.

In the embodiments, using the friction plate 10 to provide friction damping.

For example, the elastic member 8 may be a spring, but not limited to this.

For example, the fixing member 101 is a nut spirally connected to the second connecting rod 7, but not limited to this.

Referring to FIG. 15, for example, the rotary shaft mechanism further includes a concave convex wheel 9 between the friction plate 10 and the elastic member 8, and a concave convex surface of the concave convex wheel 9 is connected to the friction plate 10, where the concave convex wheel 9 refers to a hollow annular component having two opposite end faces, at least one of which is a concave convex surface.

The concave convex wheel 9 and the elastic member 8 are configured to provide axial pressure to ensure a resistance value, which can make greater use of the friction plate 10 to ensure that each surface can provide friction damping.

It should be noted that in order to ensure a structural strength of the high torque rotary shaft, the axial thickness of the fixing plate 5 can be increased to ensure that the fixing plate 5 will not be damaged under high torque conditions. At the same time, multiple friction plates 10 can be installed in the connecting groove 53 to increase friction damping.

The concave convex wheel 9 and the elastic member 8 can be adjusted according to the actual damping needs through the fixing member 101 (when the fixing member 101 is a nut, the position of the nut on the second connecting rod 7 can be adjusted by rotating the nut). At the same time, if a damping member of the friction plate 10 is damaged, it can be replaced by disassembling the nut, which can effectively protect the screen with a higher value and reduce losses in case of problems occurring on the rotary shaft mechanism.

The disclosed embodiments also provide a foldable display device, including the above-mentioned rotary shaft mechanism and a display panel fixed on the rotary shaft mechanism.

It can be understood that the above embodiments of the present disclosure are merely exemplary embodiments used for illustrating the principle of the present disclosure, and the present disclosure is not limited thereto. For those skilled in the art, various modifications and improvements may be made without departing from the spirit and essence of the present disclosure, and these variations and improvements are also deemed to be within the protection scope of the present disclosure.

What is claimed is:

1. A rotary shaft mechanism configured to fold a display panel, wherein, the rotary shaft mechanism comprises a curved base, two screen support plates, a curved slider, and a rotating block;

the curved base comprises a first centerline extending along a first direction, and the curved base comprises two curved connecting portions symmetrically arranged around the first centerline; in the first direction, the two screen support plates are respectively on opposite sides of the curved base, each curved connecting portion is connected to a corresponding screen support plate through the curved slider and the rotating block;

along the first direction, each curved connecting portion is divided into a second curved guide groove and a first curved guide groove, both the second curved guide groove and the first curved guide groove extend along a second direction, the second direction is perpendicular to the first direction;

the rotating block comprises a curved connector connected to the first curved guide groove, and a sliding connector slidably connected to the screen support plate;

the curved slider is rotatably connected to an inner wall of the second curved guide groove, and the curved slider is rotatably connected to the screen support plate through a pin-shape shaft, a vertical distance between a rotation center of the curved slider and a first plane is different from a vertical distance between a rotation center of the rotating block and the first plane, so that when the rotary shaft mechanism is folded, the rotating block and the screen support plate slide relatively in a direction parallel to the screen support plate, and the first plane is a contact plane between the screen support plate and the rotating block;

wherein a side of the curved slider is provided with a first pin-shape shaft hole that runs through the curved slider in the first direction, the screen support plate is provided with a second pin-shape shaft hole that matches the first pin-shape shaft hole to allow the pin-shape shaft to pass through.

2. The rotary shaft mechanism according to claim 1, wherein a strip-shaped hole extending along the second direction is in the sliding connector, and a sliding groove is in the screen support plate and used for inserting the sliding connector, a sliding hole is in one side of the sliding groove away from a bearing surface of the screen support plate, and a length of the sliding hole in the second direction is smaller than a length of the strip-shaped hole in the second direction, the sliding hole is to be matched with the strip-shaped hole to allow a sliding member to pass through, and to enable the sliding member to slide along the strip-shaped hole.

3. The rotary shaft mechanism according to claim 2, wherein, in the first direction, the rotating block further comprises a reinforcing rod on one side of the strip-shaped hole.

4. The rotary shaft mechanism according to claim 2, wherein, when in an unfolded state, the sliding hole is in the middle of the strip-shaped hole, or at one end of the strip-shaped hole near the curved connector; when in a folded state, the screen support plate slides relative to the rotating block, and the sliding hole is at one end, away from the curved connector, of the strip-shaped hole.

5. The rotary shaft mechanism according to claim 1, wherein both the second curved guide groove and the first curved guide groove are in the middle of the curved connecting portion in a third direction;

in an unfolded state, a surface of the curved connecting portion is in a same plane as a bearing surface of the screen support plate, the third direction is perpendicular to the first direction, and the third direction is perpendicular to the second direction.

6. The rotary shaft mechanism according to claim 1, further comprising:

a gear group, a connecting rod, a synchronous transmission rod, and a fixing plate on the curved base, wherein the connecting rod extends along the first direction, and a first end of the synchronous transmission rod is meshed and connected with the gear group, and is sleeved on the connecting rod and is rotatable around the connecting rod, a second end of the synchronous transmission rod is fixed on the screen support plate, and the fixing plate is sleeved on the connecting rod, the fixing plate is on one side of the synchronous transmission rod away from the curved base;

one side, close to the fixing plate, of the first end of the synchronous transmission rod is provided with a limiting protrusion, and a limiting groove is provided in the fixing plate, the limiting groove is matched with the limiting protrusion to limit a position of the synchronous transmission rod in a unfolded state or a folded state.

7. The rotary shaft mechanism according to claim 6, wherein an end surface of the first end is divided into a first portion and a second portion, the first portion is convex to form the limiting protrusion having a fan shape, the limiting protrusion is rotatably accommodated in the limiting groove, the second portion is rotatably connected to connecting surfaces around the limiting groove.

8. The rotary shaft mechanism according to claim 6, further comprising:

a friction plate, an elastic member, and a fixing member, wherein the elastic member is sleeved on the connecting rod and on one side of the fixing plate away from the curved base, the fixing member is sleeved on the connecting rod and on one side of the elastic member away from the fixing plate, so as to fix the elastic member;

the fixing plate comprises a via hole, the via hole allows the connecting rod to pass through, and the fixing plate comprises a first surface connected to the elastic member, a connecting groove is formed by depressing surroundings of the via hole on the first surface, and the friction plate is connected to an inner wall of the connecting groove.

9. The rotary shaft mechanism according to claim 8, further comprising:

a concave convex wheel between the friction plate and the elastic member, wherein a concave convex surface of the concave convex wheel is connected to the friction plate.

10. A foldable display device, comprising:

a rotary shaft mechanism; and a display panel fixed on the rotary shaft mechanism, wherein the rotary shaft mechanism comprises a curved base, two screen support plates, a curved slider, and a rotating block;

the curved base comprises a first centerline extending along a first direction, and the curved base comprises two curved connecting portions symmetrically arranged around the first centerline; in the first direction, the two screen support plates are respectively on opposite sides of the curved base, each curved connecting portion is connected to a corresponding screen support plate through the curved slider and the rotating block;

along the first direction, each curved connecting portion is divided into a second curved guide groove and a first curved guide groove, both the second curved guide groove and the first curved guide groove extend along a second direction, the second direction is perpendicular to the first direction;

the rotating block comprises a curved connector connected to the first curved guide groove, and a sliding connector slidably connected to the screen support plate;

the curved slider is rotatably connected to an inner wall of the second curved guide groove, and the curved slider is rotatably connected to the screen support plate through a pin-shape shaft, a vertical distance between a rotation center of the curved slider and a first plane is different from a vertical distance between a rotation center of the rotating block and the first plane, so that when the rotary shaft mechanism is folded, the rotating block and the screen support plate slide relatively in a direction parallel to the screen support plate, and the first plane is a contact plane between the screen support plate and the rotating block;

wherein a side of the curved slider is provided with a first pin-shape shaft hole that runs through the curved slider in the first direction, the screen support plate is provided with a second pin-shape shaft hole that matches the first pin-shape shaft hole to allow the pin-shape shaft to pass through.

11. The foldable display device according to claim 10, wherein a strip-shaped hole extending along the second direction is in the sliding connector, and a sliding groove is in the screen support plate and used for inserting the sliding connector, a sliding hole is in one side of the sliding groove away from a bearing surface of the screen support plate, and a length of the sliding hole in the second direction is smaller than a length of the strip-shaped hole in the second direction, the sliding hole is to be matched with the strip-shaped hole to allow a sliding member to pass through, and to enable the sliding member to slide along the strip-shaped hole.

12. The foldable display device according to claim 11, wherein, in the first direction, the rotating block further comprises a reinforcing rod on one side of the strip-shaped hole.

13. The foldable display device according to claim 11, wherein, when in an unfolded state, the sliding hole is in the middle of the strip-shaped hole, or at one end of the strip-shaped hole near the curved connector; when in a folded state, the screen support plate slides relative to the rotating block, and the sliding hole is at one end, away from the curved connector, of the strip-shaped hole.

14. The foldable display device according to claim 10, wherein both the second curved guide groove and the first curved guide groove are in the middle of the curved connecting portion in a third direction;

in an unfolded state, a surface of the curved connecting portion is in a same plane as a bearing surface of the screen support plate, the third direction is perpendicular to the first direction, and the third direction is perpendicular to the second direction.

15. The foldable display device according to claim 10, further comprising:

a gear group, a connecting rod, a synchronous transmission rod, and a fixing plate on the curved base, wherein the connecting rod extends along the first direction, and a first end of the synchronous transmission rod is meshed and connected with the gear group, and is sleeved on the connecting rod and is rotatable around the connecting rod, a second end of the synchronous transmission rod is fixed on the screen support plate, and the fixing plate is sleeved on the connecting rod, the fixing plate is on one side of the synchronous transmission rod away from the curved base;

one side, close to the fixing plate, of the first end of the synchronous transmission rod is provided with a limiting protrusion, and a limiting groove is provided in the fixing plate, the limiting groove is matched with the limiting protrusion to limit a position of the synchronous transmission rod in a unfolded state or a folded state.

16. The foldable display device according to claim 15, wherein an end surface of the first end is divided into a first portion and a second portion, the first portion is convex to form the limiting protrusion having a fan shape, the limiting protrusion is rotatably accommodated in the limiting groove, the second portion is rotatably connected to connecting surfaces around the limiting groove.

17. The foldable display device according to claim 15, further comprising:

a friction plate, an elastic member, and a fixing member, wherein the elastic member is sleeved on the connecting rod and on one side of the fixing plate away from the curved base, the fixing member is sleeved on the connecting rod and on one side of the elastic member away from the fixing plate, so as to fix the elastic member;

the fixing plate comprises a via hole, the via hole allows the connecting rod to pass through, and the fixing plate comprises a first surface connected to the elastic member, a connecting groove is formed by depressing surroundings of the via hole on the first surface, and the friction plate is connected to an inner wall of the connecting groove.

18. The foldable display device according to claim 17, further comprising:

a concave convex wheel between the friction plate and the elastic member, wherein a concave convex surface of the concave convex wheel is connected to the friction plate.

* * * * *